United States Patent
Sander et al.

(10) Patent No.: US 12,262,144 B2
(45) Date of Patent: Mar. 25, 2025

(54) IP BASED REMOTE VIDEO CONFERENCING SYSTEM

(71) Applicant: Sennheiser electronic SE & Co. KG, Wedemark (DE)

(72) Inventors: Christian Sander, Düsseldorf (DE); Thomas Jaskolka, Göttingen (DE)

(73) Assignee: Sennheiser electronic SE & Co. KG, Wedemark (DE)

( * ) Notice: Subject to any disclaimer, the term of this patent is extended or adjusted under 35 U.S.C. 154(b) by 100 days.

(21) Appl. No.: 17/966,005

(22) Filed: Oct. 14, 2022

(65) Prior Publication Data
US 2024/0129433 A1    Apr. 18, 2024

(51) Int. Cl.
| | |
|---|---|
| H04N 7/15 | (2006.01) |
| G06T 7/70 | (2017.01) |
| H04L 12/18 | (2006.01) |
| H04N 7/14 | (2006.01) |

(52) U.S. Cl.
CPC .............. *H04N 7/152* (2013.01); *G06T 7/70* (2017.01); *H04L 12/1822* (2013.01); *H04N 7/147* (2013.01)

(58) Field of Classification Search
CPC .......... H04N 7/152; H04N 7/147; H04N 7/15; H04N 7/14; G06T 7/70; H04L 12/1822; H04L 12/18
See application file for complete search history.

(56) References Cited

U.S. PATENT DOCUMENTS

| | | | |
|---|---|---|---|
| 2020/0145753 A1* | 5/2020 | Rollow, IV | ............ H04R 1/406 |
| 2020/0162618 A1* | 5/2020 | Enteshari | ............... H04M 3/562 |

* cited by examiner

*Primary Examiner* — Yosef K Laekemariam
(74) *Attorney, Agent, or Firm* — Jon E. Gordon; Haug Partners LLP

(57) ABSTRACT

An IP based remote video conferencing system (100) comprises a near-end (200) having a first room (200a) and at least one microphone (210) configured to detect audio signals from at least one participant (201, 202) in the first room (200a) and to determine position information regarding the at least one first participant (201, 202), a far end (300) having a second room (300a) with at least one second participant (301) and at least one audio reproducer (330), wherein said at least one audio reproducer (330) receives and reproduces spatial audio signals based on the audio signals and the position information detected by the at least one microphone (210), and a video conferencing service (400) coupled to the near end (200) and the far end (300) configured to forward audio signals from the near end (200) to the far end (300).

10 Claims, 6 Drawing Sheets

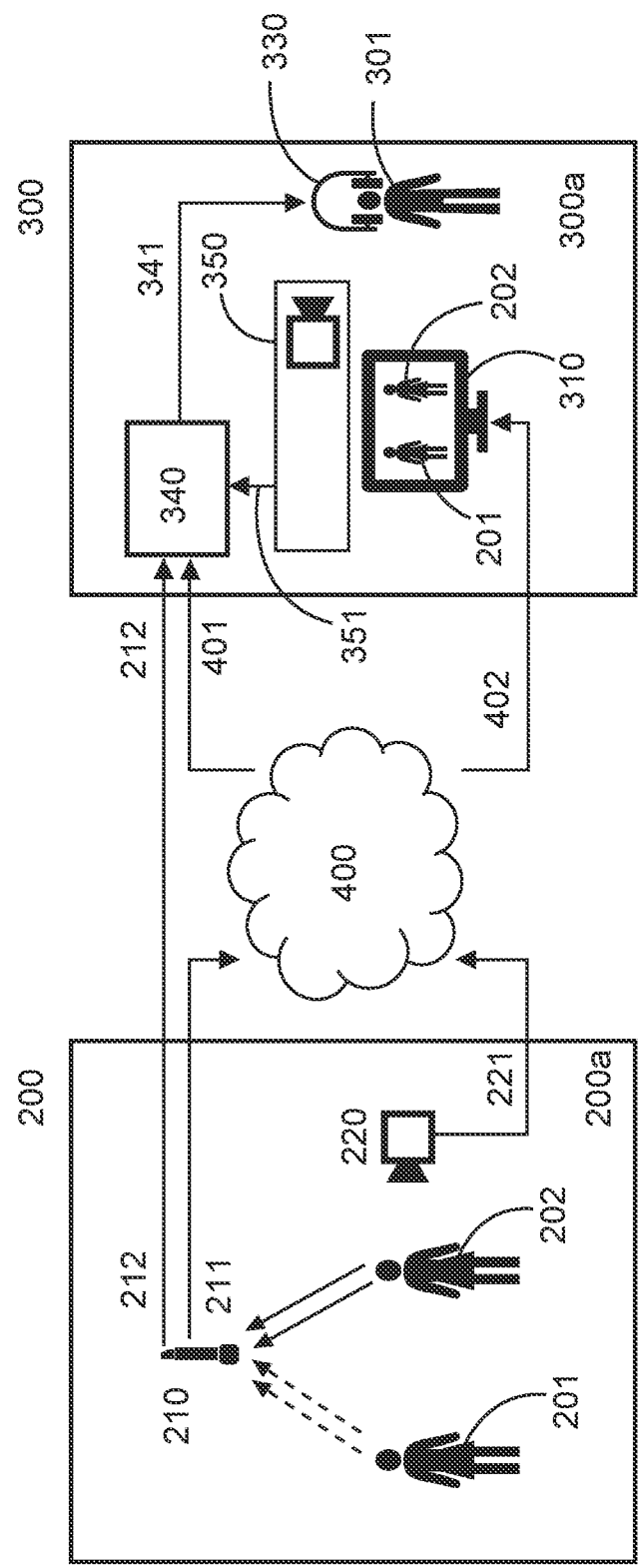

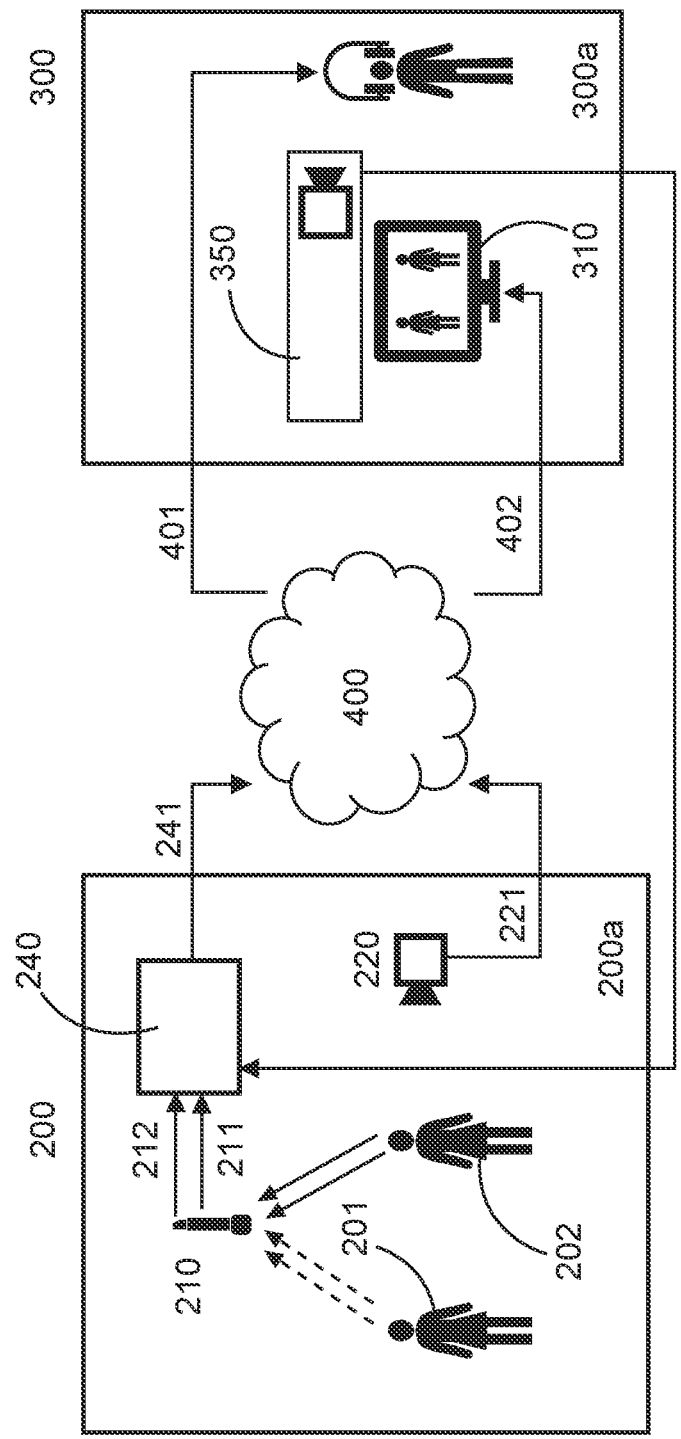

IP BASED REMOTE VIDEO CONFERENCING SYSTEM

The present invention relates to an IP based remote video conferencing system.

Figure 1:
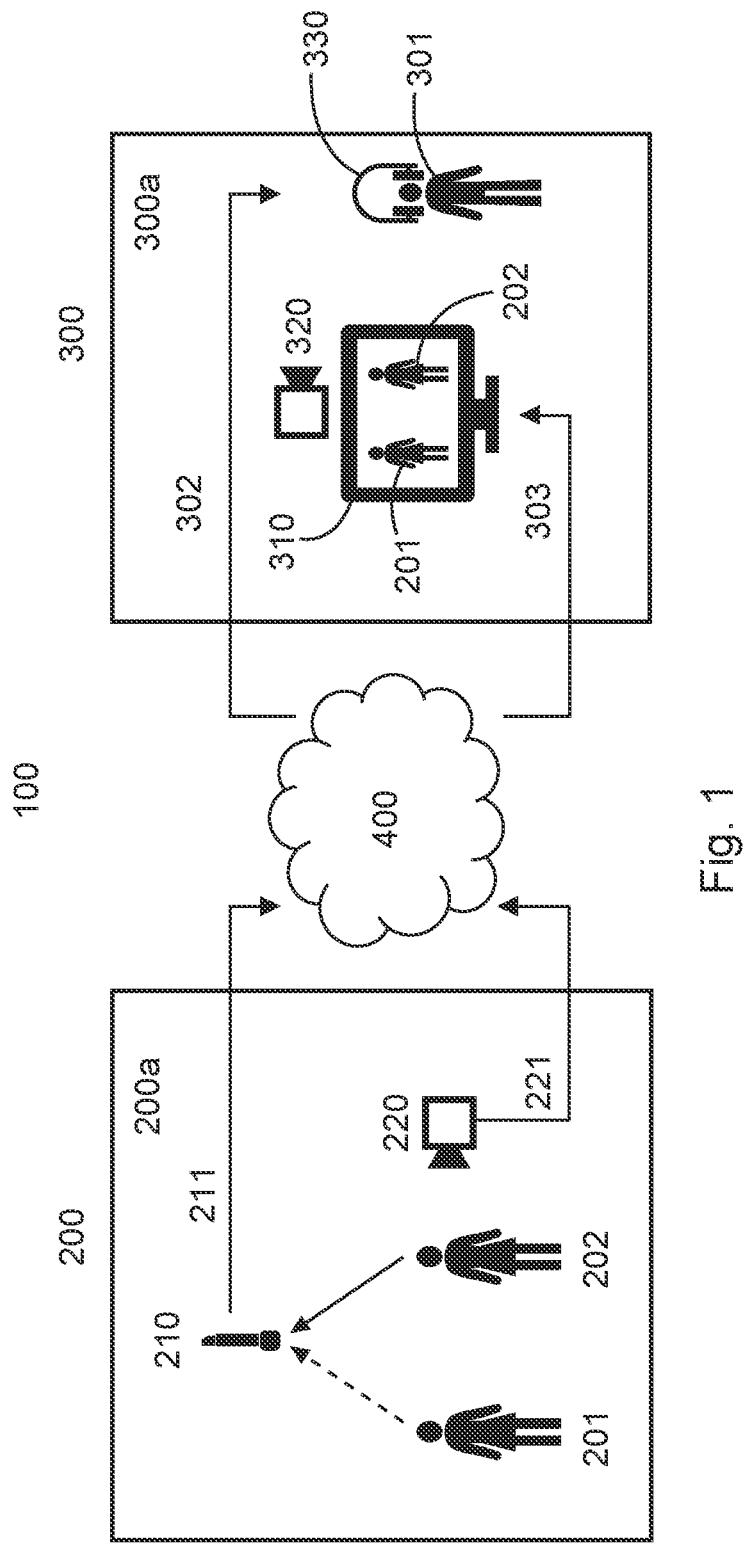

FIG. 1 shows a basic representation of a remote IP based video conferencing system. The conferencing system 100 comprises a near end 200 and a far end 300. At the near end 200, two or more participants 201, 202 are present in the conference room. The conference room comprises at least one microphone 210 and a camera 220. The audio signals from the two participants 201, 202 are detected by the at least one microphone 210 and are forwarded as audio signals 211 to a cloud based video conferencing service 400. On the other hand, at the far end 300, a further conference room is present, where a third participant 301 is at a remote location with respect to the near end 200 and also wants to participate in the video conference. In the conference room, a display 310 and a camera 320 are provided. The user or participant 301 wears a headphone or earphone 330. The headphone 330 receives audio signals 302 from the cloud based video conferencing service 400. Furthermore, the display 310 receives video signals 303 from the cloud based video conferencing service 400. Accordingly, the participant 301 at the far end 300 can participate in the video conference together with the two participants 201, 202 at the near end 200.

However, the participant 301 must rely on the audio signal 302 as received from the cloud based video conferencing service. The cloud based video conferencing service can be based on an IP connection like the internet and a conferencing system like Microsoft® Teams, Zoom etc. is running in the cloud. Accordingly, a hybrid video conference is disclosed in FIG. 1. While the at least two participants 201, 202 at the near end 200 do not have any restrictions regarding their hearing experience, the participant 301 at the far end lacks the hearing experience as the two participants 201, 202 in the near end. In particular, if the speakers 201, 202 are speaking in turns, the participant 301 at the far end 300 may have difficulties to follow the conversation.

It is therefore an object of the invention to provide an IP based remote video conferencing system which allows the participants to have a more comfortable video conferencing system. In particular, it is an object of the invention to provide a video conferencing system that allows an improved hearing experience.

This object is solved by an IP based remote video conferencing system according to claim 1.

With the video conferencing system according to an example, it is possible fora participant at a far end of the video conferencing to also experience a similar spatial hearing experience, as a user at the near end, i.e. a user that is in the same room as the other users. This can be achieved by rendering audio signals with spatial information via the headphone of the user or participant.

According to an example, a video conferencing system is provided having a near end, a far end and a video conferencing service. At the near end, a microphone is provided which can detect audio signals of participants in a conference room. Furthermore, the microphone is able to determine position information of the participants based on the received audio signals. In particular, the microphone can detect a position of a user by determining a direction of sound which is detected. The position information as well as the detected audio signals are processed by an audio processor to generate spatial audio. The audio processor can be arranged at the far end or at the near end. With this arrangement, a spatial hearing experience can be provided for a participant at the far end.

If a video camera is present in the video conferencing room, then the position of the audio signals (i.e. the participants) must be aligned to the position of the camera. Therefore, it is possible to generate spatial audio signal which is aligned to the position of the camera (instead of the absolute position of the participants in the near end).

According to an example, a video conferencing system is provided with a near end with participants and a microphone, a far end with at least one participant and a video conferencing service. At the near end, a microphone is provided which can detect audio signals and which can determine position information of the participants. At the far end, a head tracking of a user is provided. The head tracking information (i.e. the direction of the head of the user) is forwarded to an audio processor which generates spatial audio. The audio processor can be arranged at the far end or at the near end. Accordingly, together with the head tracking information, an improved spatial audio experience can be provided for the participant 301 in the far end even if he is turning his head. He will still receive the correct direction of a source of an audio signal. Hence, a more natural spatial hearing experience can be provided even for a participant at the far end of a video conferencing system. Optionally, the position of the display, where a video signal is displayed, can be used to further improve a spatial hearing experience.

According to an example, a video conferencing system is provided which has a near end with several participants, a far end with at least one participant and a video conferencing service. The audio signal from the participants at the near end, the video signal from the participants at the near end as well as position information of the participants at the near end are synchronized in order to allow a synchronized spatial audio experience which is aligned to the video signal displayed on the display.

With the IP based remote video conferencing system it is now possible to allow a spatial audio also in hybrid conferences such that the participants can interact naturally even if they are sitting at remote locations. This is advantageous as it can increase the focus, the inclusion of all participants and the collaboration of the participants. Thus, the video conferencing system can become more productive and more enjoyable.

Further aspects of the invention are described in the dependent claims.

Advantages and embodiments of the invention are now described with reference to the figures.

Figure 2A:
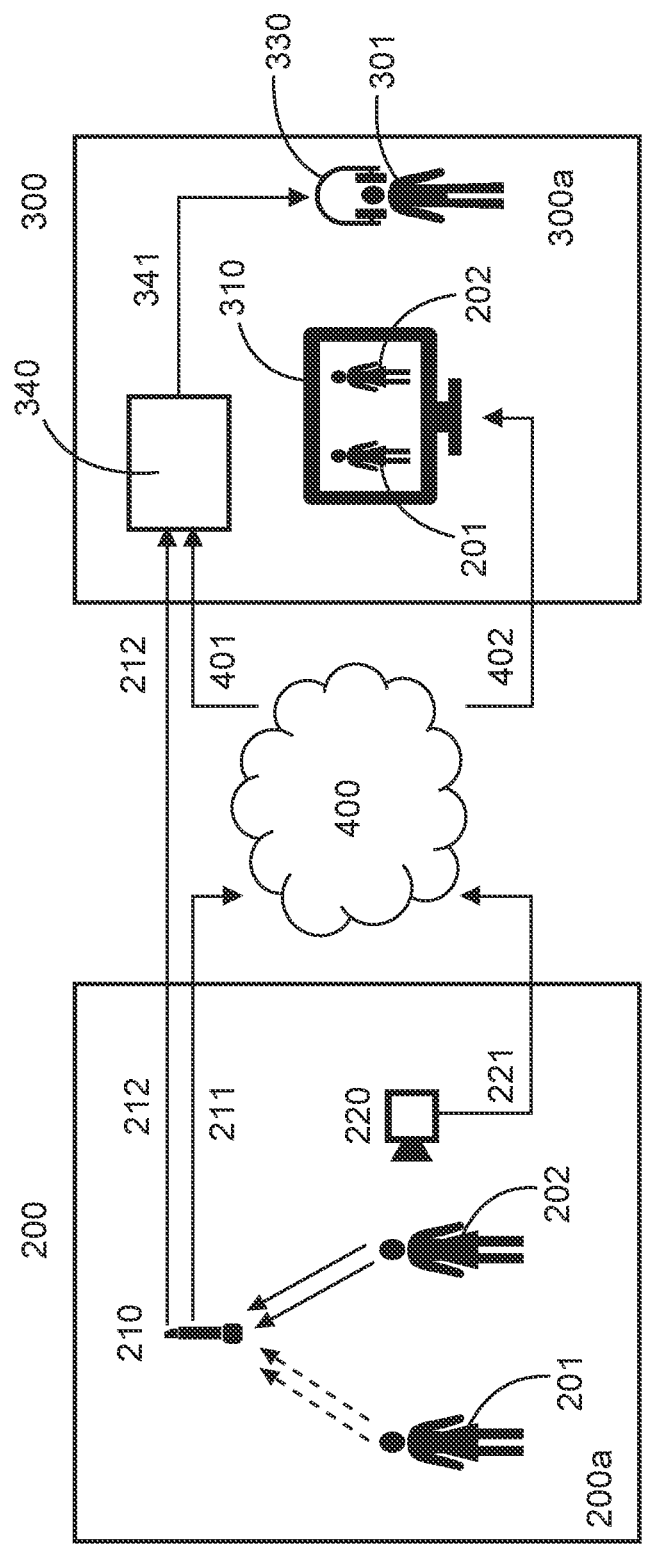
Figure 2B:
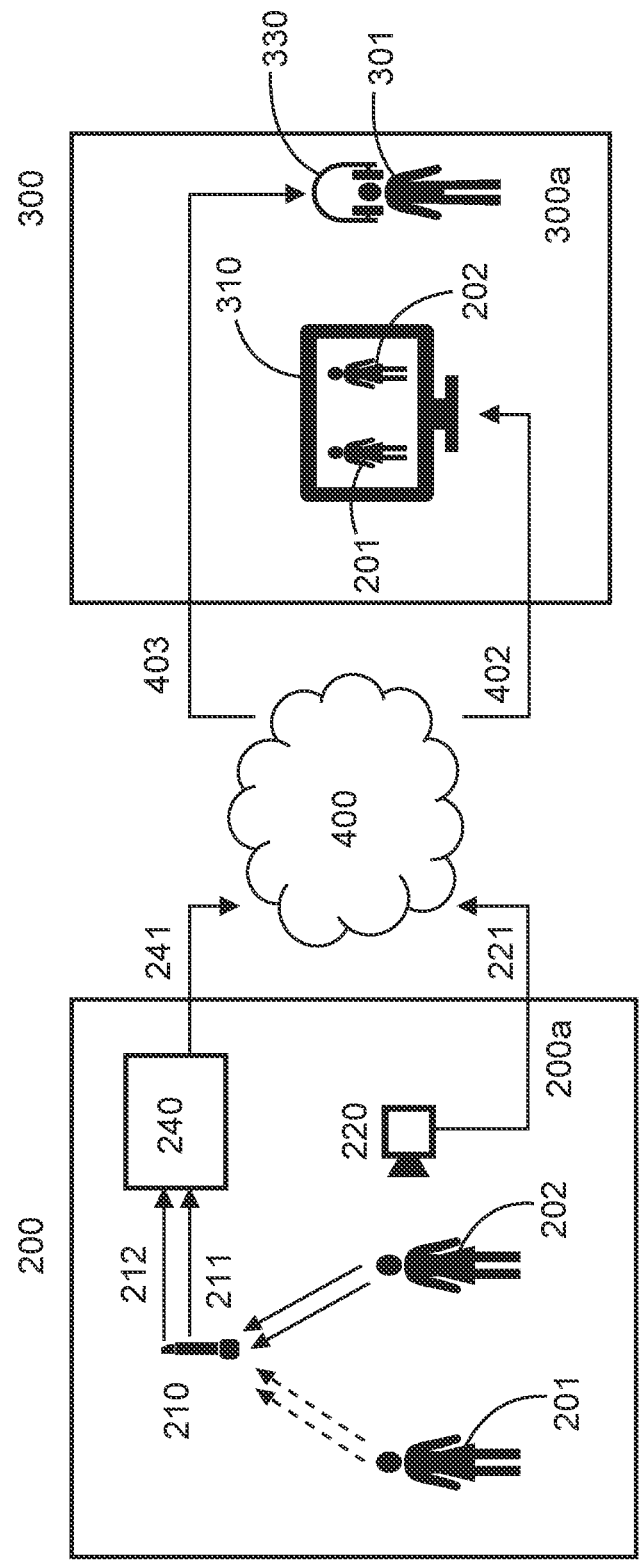
Figure 4:
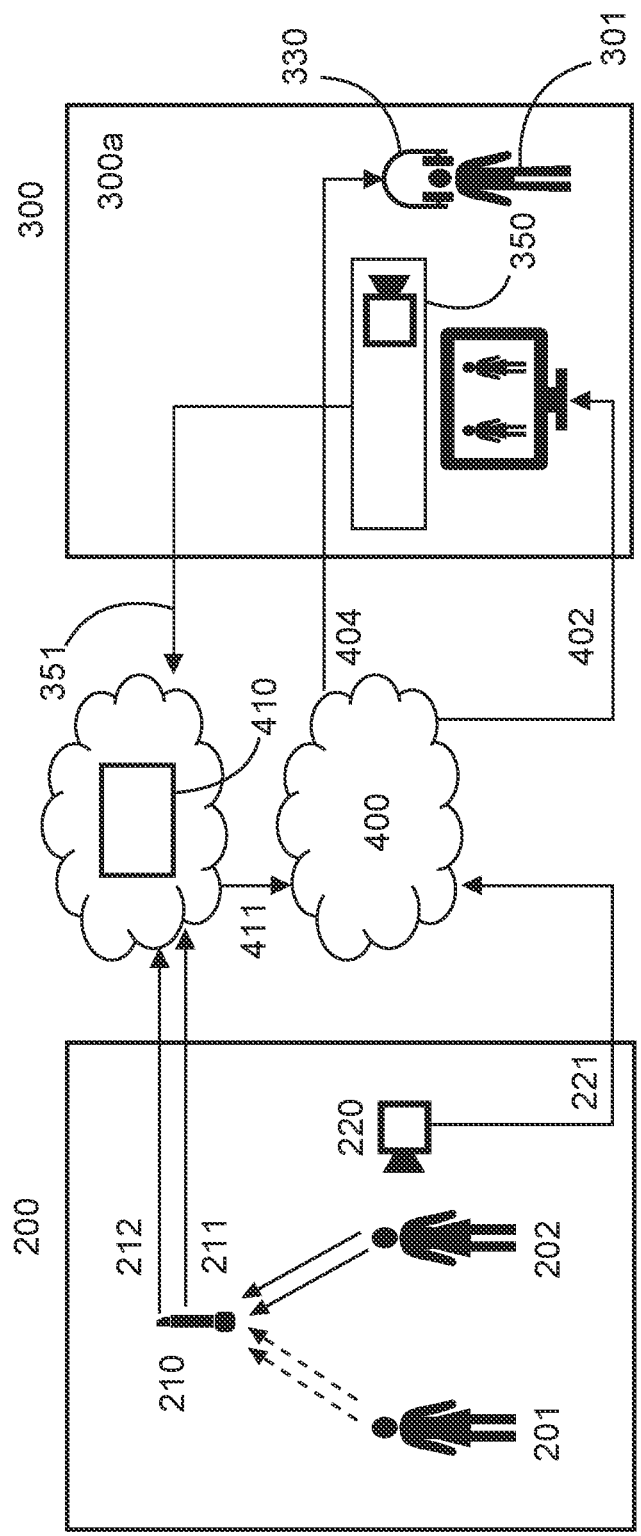

FIG. 1 discloses a cloud based video conferencing system according to the prior art, FIG. 2A discloses a schematic representation of a video conferencing system with an audio rendering at a far end, FIG. 2B discloses a basic representation of a video conferencing system with a rending at the near end, FIG. 3A discloses a basic representation of a video conferencing system with a rendering at the far end, FIG. 3B discloses a basic representation of a video conferencing system with a rendering at a near end, and FIG. 4 discloses a basic representation of a video conferencing system.

FIG. 2A discloses a schematic representation of a video conferencing system with an audio rendering at a far end. The conferencing system 100 comprises a near end 200, a far end 300 and a cloud based video conferencing service 400. At the near end 200, a room 200a, at least one microphone 210 and a video camera 220 is provided. The microphone 210 detects audio signals from participants 201, 202 as well as their position. The microphone 210 outputs a common mono audio signal 211 as well as position information 212 of the participants. The video camera 220 outputs a video signal 221 of the participants 201, 202. The audio signal 211 as well as the video signal 221 is received by the video conferencing service 400. The video conferencing service 400 outputs an audio signal 401 and a video signal 402.

At the far end 300, a display 310 can be optionally provided which receives the video signal 402 and displays the video signal on the display 310 such that at least the participants 201, 202 are visible on the display 310. Additionally, at the far end 300, an audio processor 340 is provided which receives the audio signal 401 from the service 400 as well as the position information 212. Based on this information, a spatial audio signal 341 is provided which is outputted to the headset 330 of the participant 301. Accordingly, the audio signal is outputted together with spatial information, i.e. a spatial audio. The spatial audio signal 341 can be a two-channel signal, comprising a left channel and a right channel. In case of replaying the spatial audio signal 341 via the headset 330, the spatial audio signal 341 can be generated by binaural rendering.

Alternatively to the headset 330 a loudspeaker setup in the far end room 300a can be used for replaying the spatial audio signal 341. In this case the audio processor 340 generates the signals for all loudspeakers in a loudspeaker setup.

The microphone 210 can be implemented as a microphone array which is arranged at the ceiling of the conference room 200a. The microphone array can allow the detection of various audio signals in a conference room (for example, audio signals from participants). The microphone array can also be able to detect a position of a user based on the direction, from which the sound originates. Accordingly, the microphone 210 can detect audio signals and determine the position from the origins of the audio signals. In the embodiment of FIG. 2A, the video conferencing system allows a rendering of spatial audio for a participant at the far end. The audio signal 211 as well as the position information 212 can be forwarded to the video conferencing service 400, which can process data and forward the data to the far end. Alternatively, the position information 212 can be forwarded directly to the far end without being processed by the video conferencing service. The video conferencing service 400 can be based on an IP protocol. The video conferencing service 400 can be implemented as a cloud based video conferencing service. However, also other implementations are possible. At the far end, an audio processor 340 is provided which receives the position information as well as the audio signal and creates a spatial audio signal for example in stereo such that the stereo signal can be reproduced by the loudspeakers or by heado phones (i.e. binaural audio).

FIG. 2B discloses a basic representation of a video conferencing system with a rending at the near end. The video conferencing system 100 comprises a near end 200, a far end 300 and a video conferencing service 400. At the near end 200, participants 201, 202 may be present. Furthermore, a microphone 210 is provided which detects audio signals from the participants 201, 202 as well as their positions. Accordingly, the microphone 210 outputs position information 212 as well as audio signals 211. At the near end 200, an audio signal processor 240 is provided which receives the audio signals 211 as well as the position information 212 and generates a spatial audio signal 241. The spatial audio signal 241 can be a two-channel signal, comprising an left channel and a right channel. At the near end 200, furthermore, a camera 220 can be provided which outputs a video signal 221. The video signal 221 as well as the spatial audio signal 241 is received by the cloud based service 400. The cloud based service 400 outputs a spatial audio signal 403 as well as a video signal 402 which can be displayed on the display 310. The spatial audio signal 403 can be replayed on the headphone 330.

In the embodiment of FIG. 2A, the spatial audio signal was generated at the far end. In contrast, according to the embodiment of FIG. 2B, the spatial audio signal is generated at the near end by the audio processor 240. The audio processor 240 receives the position information 212 as well as the audio signal 211 and generates a spatial audio signal 241 which is transmitted to the video conferencing service 400 and from there to the far end such that the spatial audio signal can be reproduced by a headphone 330 of a user. In the embodiment of FIG. 2B the spatial audio signal 241 can be a two-channel signal, comprising a left channel and a right channel. Thus, the video conferencing service 400 must be configured for transmitting a two-channel audio signal 241 form the near end to the far end. The embodiment of FIG. 2B is favourable, if the configuration as used in the far end room 300a does not include the required equipment for spatial rendering.

Alternatively, the spatial audio signal can also be reproduced by an audio system which allows a stereo replay.

In one aspect of the invention the equipment in the near end room 200a optionally provides both to the video conferencing service 400: The mono audio signal 211 with the position information 212 as shown in FIG. 2A and the two-channel spatial audio signal 241 as shown in FIG. 2B. This is advantageous for supporting different far end configurations. If the far end configuration includes the equipment 340 for spatial rendering, this equipment can be used. If the far end configuration does not include such equipment, still a spatial hearing effect can be provided. Providing the spatial audio is advantageous for the participant at the far end, as it allows him to localize from which direction the audio signal (speech signal) is coming. In the embodiment of FIGS. 2A and 2B, the position of the head of a user and therefore his ears are not considered when generating the spatial audio signals. Accordingly, if a person turns his head and therefore his ears, the spatial audio experience can be changed. For example, if the participant turns his head to the left, then the sound from the headphones will also be apparent to come from the left. Thus, the spatial audio experience may not be in line with the video signal that can be displayed on the display 310 at the far end 300.

FIG. 3A discloses a basic representation of a video conferencing system with a rendering at the far end. The video conferencing system 100 comprises a near end 200, a far end 300 and a video conferencing service 400. At the near end 200, in a conference room a microphone 210 as well as optionally a camera 220 is provided. The microphone 210 detects audio signals as well as the positions of participants 201, 202 in the room. The microphone outputs an audio signal as well as position information 212. The video camera 220 outputs a video signal 221. The video conferencing service 400 receives the video signal 221 as well as the audio signal 211 and outputs an audio signal 401 as well as a video signal 402. At the far end 300, a display 310 is provided which receives the video signal 402 and displays it. A participant 301 can wear a headphone or earphone 330. Furthermore, an audio processor 340 is provided which receives the position information 212 as well as the audio signal 401 and generates a spatial audio signal 341. At the far end 300, a camera system 350 is provided and serves as a head tracker of the user in order to determine the angle of the head with respect to the camera. Hence, an optical head tracker is provided. This information 351 is forwarded to the audio processor 340 which is able to include this information in the spatial audio signal.

In the embodiment of FIG. 3A, a head tracking of a participant 301 at the far end 300 is performed. This head tracking information is provided to the audio processor 340 and is used to determine the spatial audio signal 341. Accordingly, if a person is turning his head (and therefore also his ears), then the head tracker detects this deviation and the audio processor can adapt the spatial audio signal accordingly. This is advantageous as the perception of an origin of an audio signal will not change even if the participant turns his head. Thus, a more natural spatial audio hearing can be achieved for a participant at a far end of a video conferencing system.

The head tracking can be performed by an optical head tracker 350 or by a head tracker implemented in the headset 330. The only important information is the information regarding the angle of the head of a user.

FIG. 3B discloses a basic representation of a video conferencing system with a rendering at a near end. The video conferencing system 100 comprises a near end 200, a far end 300 and a video conferencing service 400. At the near end 200, participants 201, 202 are present in a room. Optionally, a video camera 220 is provided which outputs a video signal. Furthermore, at least one microphone 210 is provided for detecting audio signals as well as position information of the users 201, 202. The microphone outputs the audio signal 211 as well as position information 212 to an audio processor 240 which generates a spatial audio signal 241 which is forwarded to the video conferencing service 400 together with the video signal. The video conferencing service 400 generates an audio signal 401 based on the spatial audio signal 241. Furthermore, the video conferencing service 400 generates a video signal 402. The audio signal 401 as well as the video signal 402 are forwarded to the far end 300. The video signal can be displayed on the display 310 and the audio signal 401 can be replayed at a headphone 330 of a far end participant 301. Furthermore, a head tracker 350 in form of a camera can be provided. The head tracker serves to detect the head position of the user. This information 351 is fed back to the audio processor 240 at the near end 200, where this information is incorporated into the spatial audio signal 241.

The embodiment of FIG. 3B substantially corresponds to the embodiment of FIG. 3A. The only difference is the arrangement of the audio processor for generating spatial audio. While in the embodiment of FIG. 3A the audio processor is arranged at the far end, in the embodiment of FIG. 3B the audio processor is arranged at the near end. In both cases, the audio processor can receive head tracking information of the head of the participant at the far end. The head tracking information can be detected by an optical detector 350 or by a head tracker integrated into the headphone 330.

The embodiment of FIG. 3A (the provision of the audio processor 340 at the far end) appears to be advantageous as it will allow for a low latency application. In the embodiment of FIG. 3B, the head tracking information must be fed back from the far end to the near end before the audio processor can determine the spatial audio.

FIG. 4 discloses a basic representation of a video conferencing system. The video conferencing system 100 comprises a near end 200, a far end 300 and a video conferencing service 400. At the near end 200, at least one microphone 210 and optionally a camera 220 is provided. The microphone 210 detects audio signals and positions of participants 201, 202 in the conference room at the near end 200 and outputs position information 212 as well as a common audio signal 211. The video camera 220 outputs a video signal 221. The video conferencing service 400 can comprise a spatial audio processing service 410 which receives the position information 212 as well as the audio signal 211 and forwards a spatial audio signal 411 to the video conferencing service 400. The video conferencing service 400 outputs a spatial audio signal 404 as well as a video signal 402 which is displayed on the display 310. At the far end 300, the participant 301 has a headphone, headset or earphone 330. At the far end 300, an optical head tracker 350 in form of the camera can be provided and detects the head position of the user. This information 351 is fed back to the audio processing service 410. This information is also included into the spatial audio signal 411.

In the embodiment of FIG. 4, the head tracking information as well as the audio processor is arranged in the cloud. Accordingly, the embodiment of FIG. 4 is an alternative solution to the embodiments of FIG. 3A or FIG. 3B.

The control for the video conferencing system can be implemented at the near end (for example, in or at the microphone 210), in the cloud or at the far end. The functionality of the video conferencing system may be introduced or included into a video conferencing software or video conferencing service. Alternatively, a standalone video conferencing service can be provided. Moreover, a hotkey functionality can be implemented at the media control at the near end.

The invention claimed is:

1. An IP based remote video conferencing system, comprising:
    a near-end having a first room and at least one microphone con-figured to detect audio signals from at least one participant in the first room and to determine position information regarding the at least one first participant,
    wherein the near-end is configured to transmit a mono audio signal with the position information based on the detected audio signal as well as a two-channel spatial audio signal based on the detected audio signal,
    a far end having a second room with at least one second participant and at least one audio reproducer, wherein said at least one audio reproducer receives and reproduces spatial audio signals based on the mono audio signal with the position information or the two-channel spatial audio signal as transmitted from the near-end depending on equipment at the far-end, and
    a video conferencing service coupled to the near end and the far end configured to forward audio signals from the near end to the far end.

2. An IP based remote video conferencing system according to claim 1, wherein
    the far end comprises an audio processor configured to generate a spatial audio signal based on an audio signal received via the video conferencing ser-vice and position information of the at least one first participant,
    wherein the spatial audio signal is reproduced by the audio reproducer to create a spatial hearing experience for the at least one second participant.

3. An IP based remote video conferencing system according to claim 2, wherein
    a head tracker is provided at the far end and is configured to detect a head position of the at least one second participant, wherein the audio processor in the far end is configured to generate a spatial audio signal based on an audio signal, the position information of the at least one first participant and the head tracking data.

4. An IP based remote video conferencing system according to claim 1, wherein
the near end comprises an audio processor configured to generate a spatial audio signal based on an audio signal and position information from the at least one microphone,
wherein the spatial audio signal is transmitted by the video conferencing system to the far end and is reproduced by the audio reproducer to create a spatial hearing experience for the at least one second participant.

5. An IP based remote video conferencing system according to claim 4, wherein
a head tracker is provided at the far end and is configured to detect a head position of the at least one second participant,
wherein the near end comprises the audio processor which is configured to generate a spatial audio signal based on an audio signal, the position information of the at least one first participant and the head tracking data received via the video conferencing service.

6. An IP based remote video conferencing system according to claim 1, wherein
the video conferencing service comprises an audio processor configured to generate a spatial audio signal based on an audio signal from the at least one microphone and position information of the at least one first participant,
wherein the spatial audio signal is reproduced by the audio reproducer to create a spatial hearing experience for the at least one second participant.

7. An IP based remote video conferencing system according to any one of the claims 1 to 6, wherein
the near end comprises a video camera configured to generate a video signal of the at least one first participant,
wherein the video signal is transmitted to the video conferencing service,
wherein the audio signal, the position information and the video signal transmitted from the near end are synchronized.

8. A method for controlling an IP based remote video conferencing system having a near-end having a first room and at least one microphone configured to detect audio signals from at least one participant in the first room and to determine position information regarding the at least one first participant, a far end having a second room with at least one second participant and at least one audio reproducer, and a video conferencing service coupled to the near end and the far end configured to forward audio signals from the near end to the far end, comprising the steps of:
transmitting a mono audio signal with the position information based on the detected audio signal as well as a two-channel spatial audio signal based on the detected audio signal from the near-end to the far-end, and
receiving and reproducing spatial audio signals based the mono audio signal with the position information or the two-channel spatial audio signal as transmitted from the near-end depending on equipment at the far-end.

9. An IP based remote video conferencing system, comprising:
a near-end having a first room, and at least one microphone configured to detect audio signals from at least one participant in the first room and to determine position information regarding the at least one first participant,
a far end having a second room with at least one second participant, a camera as optical head tracker of the second participant, a display, and at least one audio reproducer, wherein said at least one audio reproducer receives and reproduces spatial audio signals based on the received audio signals,
wherein the camera at the far-end is configured to perform an optical head tracking of the second participant and the rendering of the spatial audio signals is aligned to the display, and
a video conferencing service coupled to the near end and the far end configured to forward audio signals from the near end to the far end.

10. An IP based remote video conferencing system according to claim 1, wherein,
the far end comprises a camera as optical head tracker of the second participant, and a display,
wherein the camera at the far-end is configured to perform an optical head tracking of the second participant and the rendering of the spatial audio signals is aligned to the display.

* * * * *